United States Patent [19]

Taylor

[11] 4,377,037

[45] Mar. 22, 1983

[54] DEVICE AND METHOD FOR THE MEASUREMENT OF THE THICKNESS OF A WET COATING

[76] Inventor: James C. Taylor, Ravenhurst, Sycamore Ave., Heywood, England

[21] Appl. No.: 235,031

[22] Filed: Feb. 17, 1981

[30] Foreign Application Priority Data

Feb. 13, 1980 [GB] United Kingdom ............... 8003042

[51] Int. Cl.³ .............................................. G01B 5/06
[52] U.S. Cl. .................................... 33/169 F; 33/170
[58] Field of Search ............ 33/125 R, 125 A, 169 R, 33/169 B, 169 F, 170; 116/202, 227, DIG. 5

[56] References Cited

U.S. PATENT DOCUMENTS

| | | | |
|---|---|---|---|
| 2,468,833 | 5/1949 | Murphy | 116/227 |
| 2,546,990 | 4/1951 | Euverard et al. | 33/169 F |
| 2,664,640 | 1/1954 | Euverard | 33/170 |
| 3,168,784 | 2/1965 | Morrissey | 33/169 F |
| 3,432,933 | 3/1969 | Wood | 33/169 F |
| 3,758,957 | 9/1973 | Eskijian | 33/169 F |
| 3,834,235 | 9/1974 | Bouten et al. | 116/227 |
| 4,024,644 | 5/1977 | Koenig et al. | 116/227 |
| 4,078,313 | 3/1978 | Hennessy | 33/169 B |

FOREIGN PATENT DOCUMENTS

817631 8/1959 United Kingdom ............ 33/169 F

*Primary Examiner*—Richard R. Stearns
*Attorney, Agent, or Firm*—Wenderoth, Lind & Ponack

[57] ABSTRACT

A device and method for the measurement of the thickness of a wet coating, such as paint, on a substrate, the device comprising a frame with two legs having ends which may be pressed through the wet coating onto the substrate. A probe is mounted in the frame and is adjustable towards and away from the frame. An indicating scale is provided to show the position of the probe. The probe has a transparent or translucent tip so that the point at which contact is made with the wet coating may be observed. The method employs a calibration step by setting the device on an uncoated surface of the same shape as the coated surface, thereby avoiding errors due to wear of the device and curvature of the surface.

10 Claims, 4 Drawing Figures

DEVICE AND METHOD FOR THE MEASUREMENT OF THE THICKNESS OF A WET COATING

BACKGROUND OF THE INVENTION

The invention relates to a device and method for the measurement of the thickness of a wet coating on a substrate. Existing methods and apparatus for determining the thickness of a coating of paint (pigmented, i.e. opaque liquid) or the like while it is still wet suffer from various disadvantages.

One known device for this purpose is the Pfund gauge. This consists of a spherically surfaced convex lens which is pressed onto the wet film until the centre touches the substrate. The diameter of the patch of paint thus formed on the surface of the lens may be used to estimate the thickness of the film. This type of gauge causes a large blemish on the surface of the film and can be rendered inaccurate by surface tension, or by the effect of particles in the paint or coating, also by curvature of the surface.

Another known gauge is the comb-type gauge. This has sections like the teeth of a comb where the ends of the teeth are cut back to different amounts. When the comb is pressed onto the surface, it is arranged that the end teeth are pressed down to the substrate and gaps of progressive size appear under the other teeth. Thus only those teeth are marked with paint which forms a gap of less than the thickness of the film of paint or coating. This type of gauge is difficult to check and is prone to wear of the teeth which touch the substrate. It gives great errors when used on surfaces which are not flat.

BRIEF SUMMARY OF THE INVENTION

The invention seeks to provide an improved device and method for the measurement of wet coating thickness.

According to one aspect of the invention there is provided a device for the measurement of the thickness of a wet coating on a solid substrate, the device comprising a frame; at least two legs extending from the frame and having free ends which may be applied to the substrate; a probe movable with respect to the frame towards and away from the level of the free ends; and an indicator for indicating the position of the probe, the probe having a tip which is lightconducting whereby the position at which the tip makes contact with the wet coating may be observed.

According to another aspect of the invention there is provided a method of measuring the thickness of a wet coating on a solid substrate, the method consisting in taking a device according to the invention as described above, applying the ends of the legs so that they penetrate the wet coating and stand on the substrate,/advancing the probe towards the surface until the tip of the probe makes initial contact with the wet coating, as observed optically via the tip, and noting the difference registered by the indicataor between the position of the probe and the position of the probe when in contact with a similar, uncoated surface.

The method preferably includes the preliminary step (although it may be done subsequently) of reading the indicator when the device is placed on an uncoated substrate of the same shape as the coated substrate. By calibration and comparison of readings in this way compensation is automatically made for the effects of wear on the ends of the legs and for curvature of the substrate.

BRIEF DESCRIPTION OF THE DRAWINGS

The invention will further be described with reference to the accompanying drawings, of which.

The same reference numbers in the different drawings designate identical or substantially identical parts.

DETAILED DESCRIPTION OF THE PREFERRED EMBODIMENTS

Figure 1:
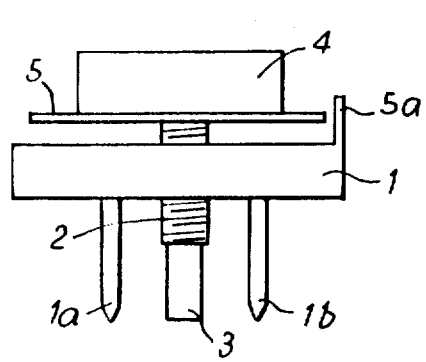
FIG. 1 is a side elevation of a device in accordance with the invention.
Figure 2:
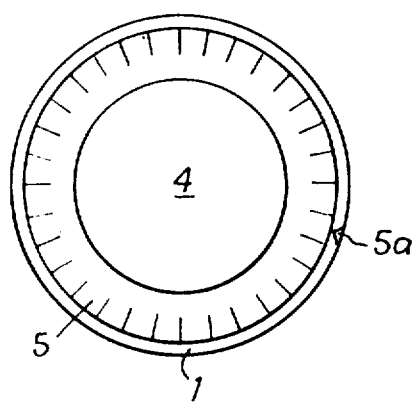
FIG. 2 is a plan view of the device of FIG. 1.

Referring to FIGS. 1 and 2, the device has a frame 1 with two legs 1a, 1b extending from it. The free ends of the legs are pointed. A probe 2 is screw-threaded in the frame to be movable axially by rotation. The probe has a transparent tip 3. In this embodiment the tip has a flat end. The position of the probe is adjusted by turning a knob 4 fixed to the upper end. Immediately beneath knob 4 is a circular scale which is held frictionally against the underside of the knob so as to rotate therewith but which is movable manually with respect to the knob to allow zeroing of the scale reading. The scale is read against a fiduciary marker 5a fixed on the frame.

The pitch of the screw is arranged in conjunction with the scale to give scale divisions of a convenient graduation. For example, a thread of 40 pitches per inch having a scale divided into 25 equal divisions, will indicate a thickness of one thousand part of an inch for each division.

The device is used as follows. The ends of the legs 1a, 1b, are pressed on a surface having the same form as the one whereon the paint or other film is to be measured, and the screw 2 is turned by means of the knob 4 until the end section 3 rests on the surface. The scale 5 is then rotated with respect to the knob 4 until the zero point of this scale coincides with the fiduciary marker 5a. The screw is then turned so as to withdraw it by more than the expected thickness of the film.

The device is now placed on the coated surface, with the ends of the legs of the frame pressed through the coating and onto the substrate. The knob 4 is now turned until the end of the tip 3 touches the surface of the coating. This will clearly be seen through the sides of the transparent tip. The thickness of the coating may now be read from the scale 5 noting that for greater than one revolution of the scale from its zero position, one pitch of the screw musts be added to the scale indication to obtain a true measure of the thickness of the film.

Figure 3:
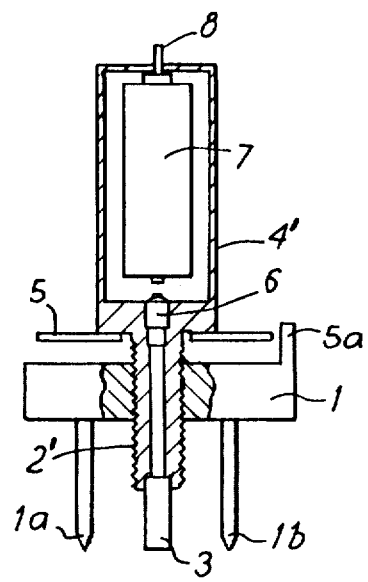
FIG. 3 is a part sectional side elevation of another device accordance with the invention.

A further improvement may be made by incorporating a means of illumination along the axis of the screw. With reference to FIG. 3, a frame 1 is provided with a screw 2' having a transparent tip 3 and provided with a rotatable scale 5 as in FIG. 1. The screw 2' is pierced along its axis so that a lamp 6 may shine light into the back of the transparent tip 3. A battery 7 and switch 8 supply power to the lamp. The battery cover 4' is now used as a knob. The instrument is used as before, but with much greater ease in any situation where the general illumination is poor. For the measurement of thin films of coating, the device as described above, may give a scale which is not sufficiently widely spread. A further improvement to overcome this problem may be made by a modified screw arrangement.

Figure 4:
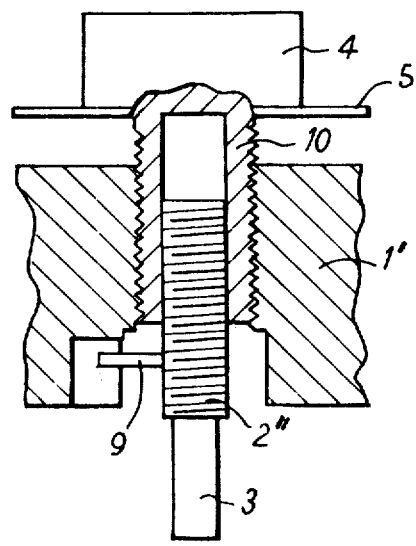
FIG. 4 is a detailed sectional view of a modified form of the device of FIGS. 1 and 2.

With reference to FIG. 4, a centre screw 2" carrying a transparent end tip 3 has a pitch of n1 inches and bears in a thread cut in the inside of a sleeve 10. Screw 2" is prevented from rotating by means of a pin 9 sliding in a suitable slot in frame 1'. The sleeve 10 has a thread of pitch n2 inches which bears in a thread cut in the frame 1': both screw 10 and screw 2" have the same hand. Thus when screw 10 is rotated one turn clockwise by means of knob 4, this part is carried forward by a distance n2 inches relative to frame 1' whilst simultaneously screw 2" is withdrawn a distance n1 inches relative to screw 10. By suitable choice of n1 and n2, screw 2" can be made to withdraw or advance in convenient units which are much more widely spaced than if a simple screw had been used. For instance, if screw 2" has 20 threads per inch, then n1 = 0.05 inch, and screw 10 has 16 threads per inch then n2 = 0.0625. Then, for one revolution of knob 4', the centre screw 2" and its transparent tip 3 are moved a total distance of 0.0125 inches which means that the scale 5 is expanded to twice the spacing which would be given by a simple screw of 40 threads per inch. Other choices for n1 and n2 may be made to give other scale factors.

The invention is not restricted to the details of the embodiments described above with reference to the drawings. For example, means other than a screw thread may be used to adjust the height of the probe; the scale disc 5 may be lockable to the probe shaft by a lock screw; the tip of the probe may be translucent instead of transparent and optical fibres may be employed; the fiduciary maker may be movable instead of the disc 5; the ends of the legs may be of a different shape than pointed; the tip of the probe may be a different shape, for example, part-sperical; and the electric bulb, if provided, may be powered from an external source via a flying lead.

What I claim is:

1. A device for the measurement of the thickness of an opaque wet coating on a solid substrate, the device comprising a frame; at least two legs extending from the frame and having free ends which may be applied to the substrate; a probe movable with respect to the frame towards and away from the level of the free ends; and an indicator for indicating the position of the probe, the probe having a tip which is light-conducting, the tip having a bottom surface engageable with the opaque wet coating and a sidewall extending upwardly from the bottom surface, the bottom surface and the sidewall being transparent to light such that the opaque wet coating is observable through the sidewall when the bottom surface is in contact with the opaque wet coating, whereby the position at which the tip makes contact with the opaque wet coating may be observed.

2. A device as claimed in claim 1 wherein the probe is screw-threaded in the frame and the indicator is a micrometer-type scale.

3. A device as claimed in claim 2 wherein the indicator comprises a calibrated disc attached to a shaft which turns the screw, a reference mark being provided on the frame, the calibrations being readable against the reference mark.

4. A device as claimed in claim 3, further comprising means for adjusting the relative positions of the disc and the reference mark for any position of the shaft so that the reading can be zeroed.

5. A device as claimed in claim 4 wherein the disc is rotatable on the shaft so as to be settable in any desired angular position.

6. A device as claimed in any of claims 2 to 5 wherein the probe comprises a first shaft which is hollow and screw-threaded in the frame and a second shaft which is screw-threaded within the first shaft, there being means locking the second shaft against rotation in the frame, and the two screw-threads being of the same hand but of different pitches.

7. A device as claimed in claim 1 wherein the probe is hollow and the tip is illuminated by an electric bulb within the device.

8. A method of measuring the thickness of an opaque wet coating on a solid substrate, using a device comprising a frame, at least two legs extending from the frame and having free ends which may be applied to the substrate, a probe movable with respect to the frame towards and away from the level of the free ends, and an indicator for indicating the position of the probe, the probe having a tip which is light-conducting, the tip having a bottom surface engageable with the opaque wet coating and a sidewall extending upwardly from the bottom surface, the bottom surface and the sidewall being transparent to light such that the opaque wet coating is observable through the sidewall when the bottom surface is in contact with the opaque wet coating, whereby the position at which the tip makes contact with the opaque wet coating may be observed, the method comprising the steps of:

applying the ends of the legs so that they penetrate a wet coating on a substrate and stand on the substrate, advancing the probe towards the surface of the wet coating until the tip of the probe makes initial contact with the wet coating, as observed optically via the tip, and noting the difference registered by the indicator between the position of the probe and the position of the probe when the legs and the tip are in contact with an uncoated surface of similar shape to the surface of the substrate.

9. A method as in claim 8 further comprising the step of applying the legs to an uncoated surface of the same shape as the surface of the coated substrate before the step of applying the ends of the legs, adjusting the probe until it touches the uncoated surface and noting the indicator reading.

10. A method as in claim 8, further comprising the step of applying the legs to an uncoated surface of the same shape as the coated substrate before the step of applying the ends of the legs, adjusting the probe until it touches the uncoated surface and zeroing and indicator reading.

* * * * *